United States Patent [19]

Gold, deceased et al.

[11] Patent Number: 4,693,436
[45] Date of Patent: Sep. 15, 1987

[54] PARACHUTE FLY-AWAY DEPLOYMENT AID

[75] Inventors: David Gold, deceased, late of Ridgecrest; Sara Gold, executrix, Glendale, both of Calif.

[73] Assignee: The United States of America as represented by the Secretary of the Navy, Washington, D.C.

[21] Appl. No.: 898,154

[22] Filed: Aug. 15, 1986

[51] Int. Cl.⁴ ............................................. B64D 17/76
[52] U.S. Cl. ..................................................... 244/149
[58] Field of Search ................ 244/147, 148, 149, 152

[56] References Cited

U.S. PATENT DOCUMENTS

| 1,771,261 | 7/1930 | Lendner | 244/142 |
|---|---|---|---|
| 2,318,674 | 5/1943 | Coleman | 244/142 |
| 2,749,066 | 6/1956 | Barnes et al. | 244/148 |
| 2,825,515 | 3/1958 | Gold | 244/152 |
| 2,981,505 | 9/1961 | Oakley | 244/149 |
| 3,188,027 | 6/1965 | Sepp, Jr. | 244/147 |
| 3,355,128 | 11/1967 | Mitchell | 244/151 R |
| 3,730,099 | 5/1973 | Schopp | 244/147 |
| 3,837,604 | 9/1974 | Matsuo | 244/152 |
| 4,087,063 | 5/1978 | Caffey | 244/148 |

FOREIGN PATENT DOCUMENTS 1130708  5/1962  Fed. Rep. of Germany ...... 244/147

Primary Examiner—Jeffrey V. Nase
Assistant Examiner—Rodney Corl
Attorney, Agent, or Firm—Robert F. Beers; Ervin F. Johnston; Thomas Glenn Keough

[57] ABSTRACT

A parachute having a canopy with a number of suspension lines has a pair of closing flaps attached to opposite sides of the canopy. Holes in flaps match locking loops on an apron and the suspension lines are bighted to hold the canopy shut as the parachute is deployed. The suspension lines are incrementally pulled free from the apron while the parachute skirt remains closed. As the suspension lines reach the locking loops and are pulled free from the locking loops, air enters the skirt to cleanly open the canopy thereby preventing unwanted parachute opening anomalies.

6 Claims, 4 Drawing Figures

PARACHUTE FLY-AWAY DEPLOYMENT AID

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The problem of parachute opening anomalies and malfunctions well known in the parachute art as "line-overs", "semi-inversions", "inversions", "Mae Wests", "cigarette rolls", etc. has been one that spans the lifetime of conventional, completely flexible parachute canopies. Irrespective of a number of developments, these problems still exist. There is a recognized problem with circular parachutes, even though they have a comparatively even skirt configuration during deployments; this problem becomes more common and severe in parachutes which have an unequal or an uneven skirt configuration during deployment. Square and triangular planformed parachute canopies exhibit this characteristic. This highly undesirable parachute opening phenomenon is a result of the fact that occasionally during the deployment phase of parachute opening, when the parachute canopy and suspension lines are being stretched out of its container and bag, it is possible for a portion of the canopy skirt to inflate under one or more suspension lines. This incorrect inflation may result in both incomplete openings of a parachute as well as damage in varying degrees.

Previous methods of deployment control have been obtained by the use of break-cords otherwise referred to as skirt hesitators or a container-like device called a quarter bag or various devices called diapers. The use of break-cords has proven to be risky in that they are not reliable or useable in a parachute which is likely to be deployed and opened within a large spectrum of operational air speeds. Quarter-bags have been shown to be complex to fabricate, store in the lower portion of the canopy in a bundle-like manner and do not completely control the closure of the parachute's skirt when release of the bag is made at the line-stretch interval. The bundle-like configuration makes it less suitable to be packed into a variety of parachute containers or packets. Diapers are configured so that the skirt portion of the canopy is secured in a unwieldy bundle-like shape. They remain attached to the parachute after the skirt portion is released and during the opening process of the parachute after skirt release, they are likely to whip around and inflict damage during high speed openings.

Thus, there is a continuing need in the state of the art for a deployment aid that holds or controls the skirt of the parachute during deployment to alleviate, if not eliminate, parachute opening anomalies.

SUMMARY OF THE INVENTION

The present invention is directed to providing a parachute deployment aid that assures clean parachute openings and reduces the possibility of parachute opening anomalies. A pair of flaps are sewn at the skirt hem of a parachute canopy at diametrically opposed positions. An apron provided with locking loops is secured to the skirt via the parachute's suspension lines which pass through the locking loops and correspondingly spaced locking holes in the flag. This holds the parachute skirt and the flaps together during the initial stages of parachute deployment. As the suspension lines are being pulled out, the locking loops pull through the holes and the the skirt now will fill to cleanly open the parachute in one continuous motion without anomalies.

A prime object of the invention is to provide a device for reducing the hazards associated with parachutes.

Another object is to provide for a parachute deployment aid that assures a clean opening of the parachute canopy.

Another object is to provide for a device which eliminates parachute opening anomalies by assuring a controlled clean opening of the canopy.

Still another object of the invention is to provide for a parachute deployment aid including a pair of diametrically opposed flaps with associated locking holes and an apron with locking loops that receive suspension line bights that assure a controlled canopy deployment.

Still another object of the invention is to provide for an aid for a parachute deployment that does not introduce unnecessary bulk or complexity through the parachute.

Still yet a further object of the invention is to provide for an orderly deployment of a parachute as the suspension lines reach a line-stretched position.

Still yet another object is to provide for a parachute deployment aid which is readily modifiable to accommodate a variety of packs to lend itself to differently shaped parachutes.

A further object is to provide for a parachute deployment aid which will not damage the parachute canopy.

These and other objects of the invention will become more readily apparent from the ensuing specification and claims when taken in consideration with the included drawings.

DESCRIPTION OF THE PREFERRED EMBODIMENT

Figures 1, 2:
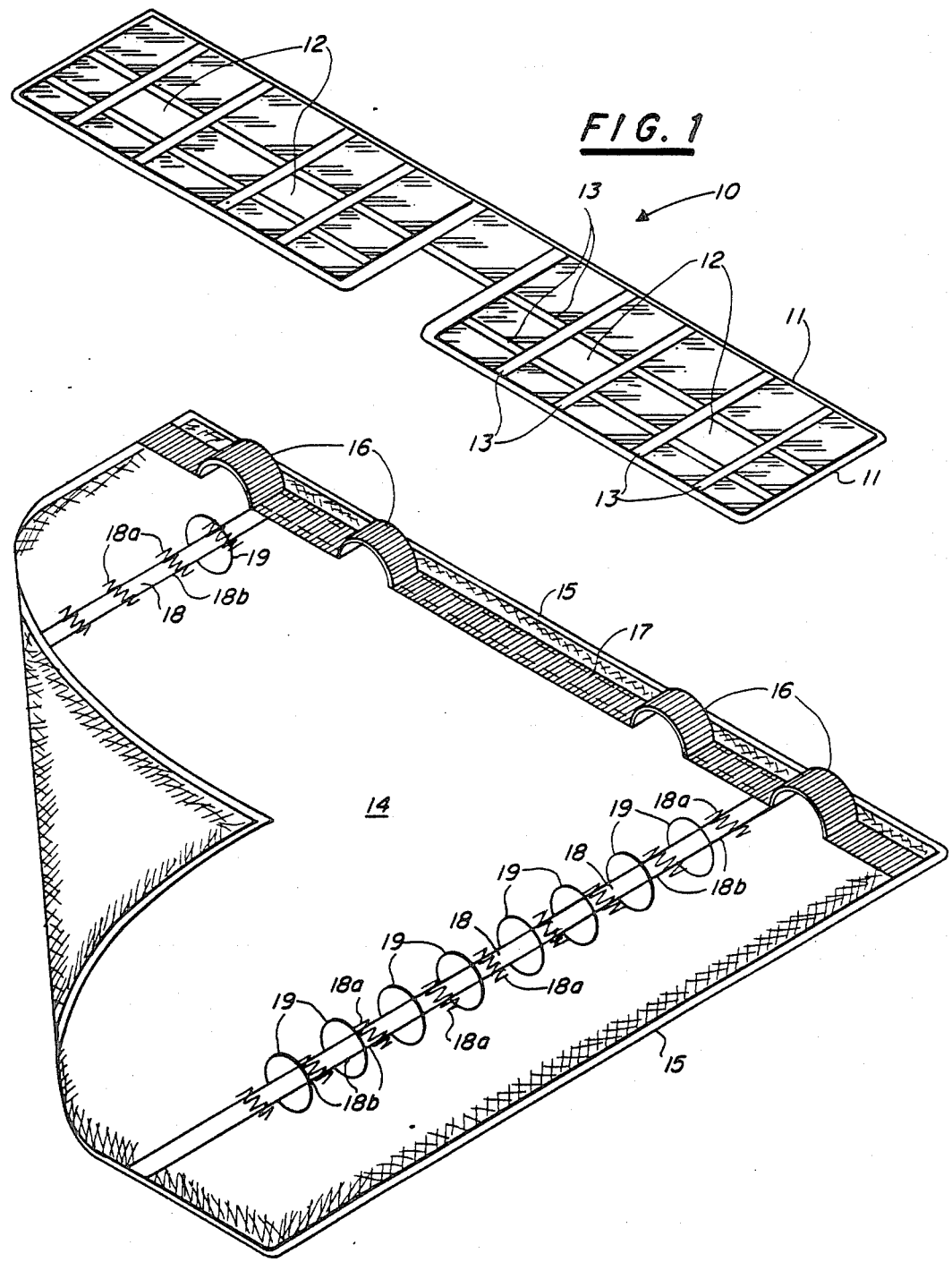
FIG. 1 depicts one of the two flaps that are constituents of the parachute deployment aid.
FIG. 2 shows the apron portion of the parachute deployment aid.

Referring to the drawings and in particular to FIG. 1, a flap portion 10 is fashioned from a textile material conventionally used in parachute design and has its borders closed by a sewn reinforced edge 11. A number of locking holes 12 are provided in the flap and each are surrounded by a network of tapes 13. Although the figure denotes a series of four holes reinforced with pependicular tapes, the flap may have less or more holes reinforced or provided with any of several means common to the parachute fabrication art.

An apron 14 is depicted in FIG. 2 and is fabricated from a textile material familiar in the parachute art. It too is provided with reinforced edges 15. A series of locking loops 16 are included in the apron and are geometrically positioned to dimensionally match the spacing of holes 12 in the flap portion. Although the loops are depicted as being strips separated from the surface of the apron they may be formed as part of a webbing reinforcement structure 17 as a design situation depicts. The apron also is configured with a web 18 that functions as a means to stow a parachute suspension line. The web is secured to the body by a series of stitches 18a to form a number of openings 18b that are created between the apron and the web. These openings serve as an anchoring means when tie cords, elastics, or any other equivalent breakable securing means 19 common to the parachute art are included.

Figure 3:
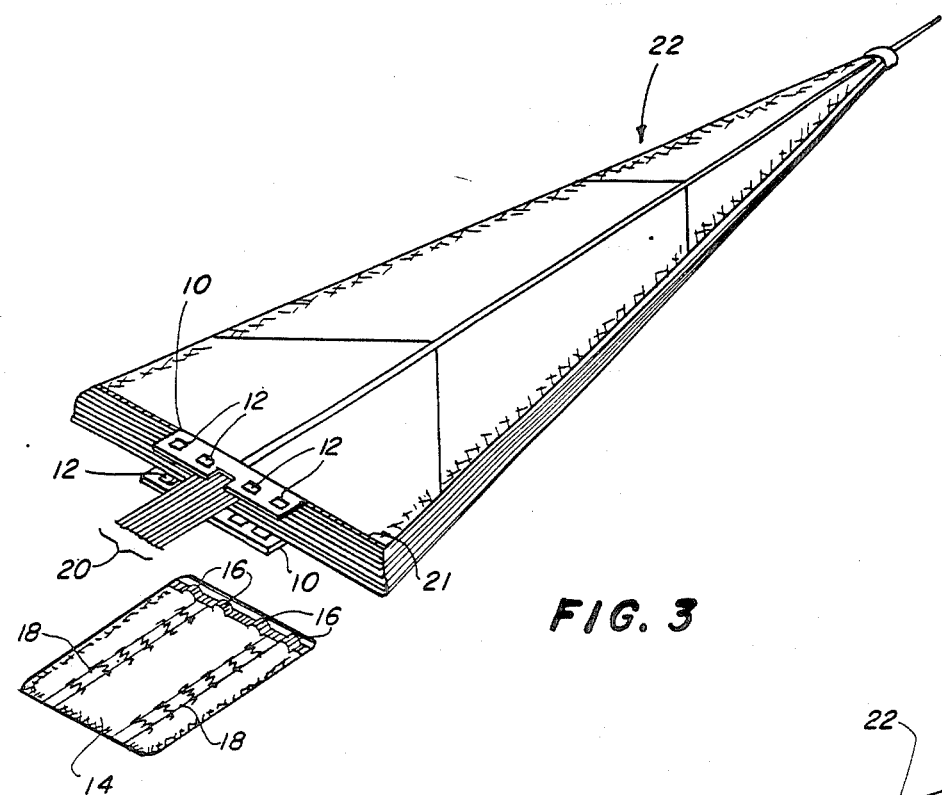
FIG. 3 is a view of the relative positions of the flap portions sewn to the parachute skirt and the apron.

Two complete flaps 10 as described above are shown in FIG. 3 and are attached by sewing at diametrically opposed locations on a skirt portion or skirt band 21 of a parachute canopy 22. The suspension lines 20 are gathered together to extend through the aligned flaps. Apron 14 is located to position loops 16 in an aligned relationship with holes 12 in the flaps.

Figure 4:
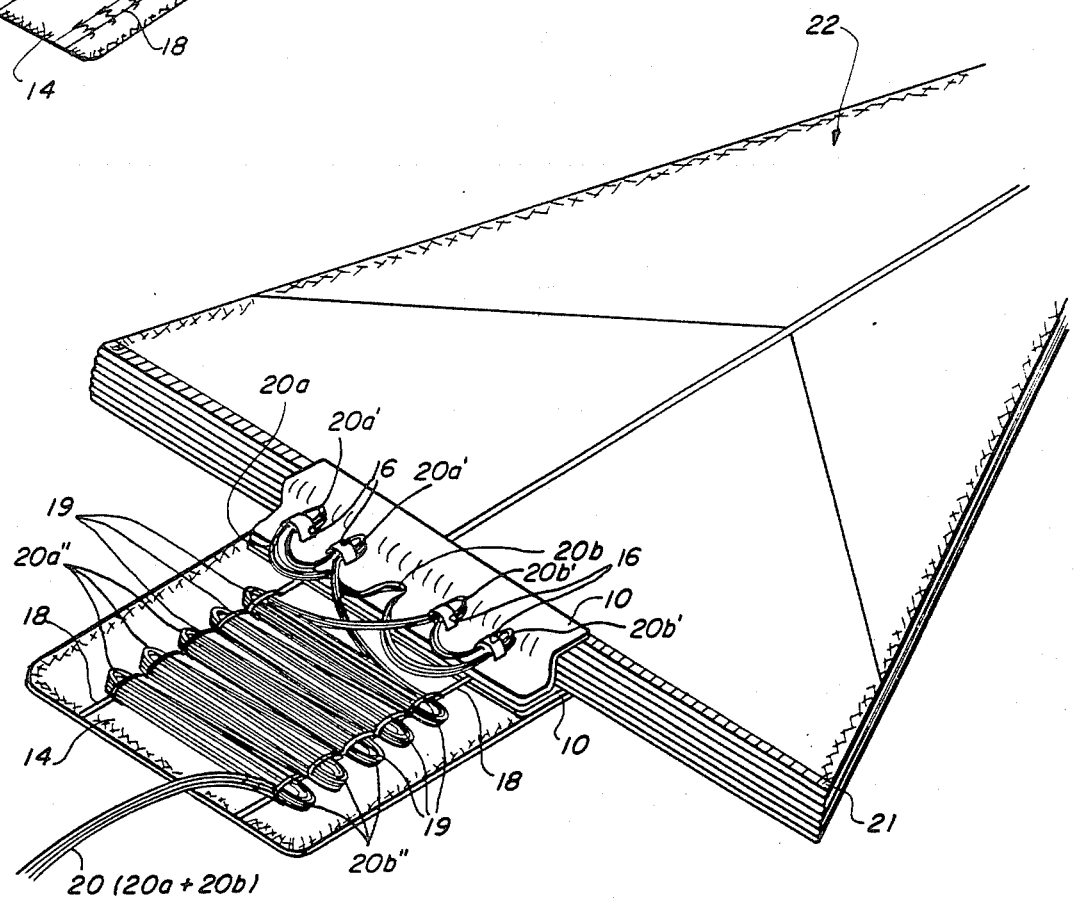
FIG. 4 is a view of the invention as installed on the parachute during the packing procedure.

Referring now to FIG. 4, during a parachute packing procedure suspension lines 20 of canopy 22 are folded and stacked in a well established manner to assume the depicted configuration having two bundles of suspension lines 20a and 20b. Flaps 10 are placed adjacent each other and locking loops 16 of apron 14 are drawn through aligned holes of both flaps 10. Loops 16 are secured in place with bights 20a' and 20b' of the suspension lines bundles 20a and 20b. In this manner, skirt portion 21 of canopy 22 is locked closed.

Further in the packing process suspension line bundles 20a and 20b are bited at 20a'' and 20b'' along webs 18 and are fastened to apron 14 via securing means 19. The bites 20a'' and 20b'' are releasably attached to webs 18 by any of accepted securing means 19 known in the parachute art such as by elastics, break cords, or other frangible means of attachment.

In operation, upon actuation of a rip cord or by means of a static line, parachute canopy 22 is extracted and deployed from its container in the normal manner. Once out of the container the parachute's suspension lines 20 are put under tension and bights 20a'' and 20b'' start to be incrementally pulled free of apron 14 by separating securing means 19. However, during this time skirt portion 21 of canopy 22 remains closed thereby eliminating the possibility of disarrangement of this area during this phase of deployment. When the suspension lines are fully separated from web 18 on apron 14, bights 20a' and 20b' of the suspension lines are separated from locking loops 16. The coaction occurs during what is known in the parachute art as the line stretch. Now, apron 14 is free to be released from flaps 10. Apron 14 flies away and skirt portion 21 opens in an even and orderly manner to allow a safe deployment of canopy 22.

This deployment aid secures the skirt in a flat, orderly manner to allow it to be used in any of a variety of packs. The major portion of this aid, apron 14 flies away after the skirt release so it cannot damage the canopy nor harm a human operator. The deployment aid keeps the mouth, or skirt portion of the parachute canopy closed and secured in an orderly configuration until the last possible moment when the line-stretch portion of the parachute opening process is reached.

Obviously, many modifications and variations of the present invention are possible in the light of the above teachings. It is therefore to be understood that within the scope of the appended claims the invention may be practiced otherwise than as specifically described.

I claim:

1. A deployment aid for controlling the opening of a parachute having a plurality of suspension lines connected to a skirt comprising:

means coupled to the skirt for providing at least one hole therethrough, the providing means is at least one flexible fabric panel having a plurality of holes therein;

means disposed adjacent the hole providing means for extending at least one fabric loop through the hole and provided with a strip of flexible material thereon having at least an opening therein, said extending means is an apron of flexible material provided with a plurality of flexible loops arranged to match and extend through the holes in the panel;

suspension lines shaped into at least one bight that reaches through the fabric loop thereby securing the providing means to the extending means and at least one more bight reaching through the opening to effect the releaseable securing of the suspension lines to the extending means, the suspension lines are configured to present a like number of bights to correspond to the number of loops to each extend through a loop to secure the panel and apron together, the providing means is a pair of flexible fabric panels each secured on the skirt at diametrically opposed locations from each other and each is provided with a plurality of holes therein and the extending means is an apron of flexible material provided with a plurality of flexible loops arranged to match and extend through the holes of both panels when they are brought together to align their respective holes and the suspension lines are configured to present a like number of bights to correspond to the number of loops to each extend through a separate loop to secure the panels and apron together and to bring the skirt to a closed position.

2. A deployment aid according to claim 1 in which the flexible material strip on the apron is configured with a plurality of openings to each receive a bight from the suspension lines to control the deployment of the parachute to line-stretch.

3. A deployment aid according to claim 2 further including:

means for releaseably securing the bighted suspension lines associated with the flexible material strip.

4. A method of aiding the deployment of a parachute provided with a plurality of suspension lines connected to a skirt comprising:

securing two flexible panels on diametrically opposed positions on the skirt, the panels each having at least one hole therein;

extending a loop from a flexible apron through the hole on both panels after the panels have been brought together and their holes aligned; and passing a bight from the suspension lines through the loop thereby securing the panels together and the skirt in a closed position.

5. A method according to claim 4 in which the step of passing further includes passing additional bights of the suspension lines through openings provided by a flexible fabric strip on the apron to further assure a deployment from a container that is free of parachute opening anomalies.

6. A method according to claim 5 in which a plurality of holes and loops are provided which are aligned with a plurality of suspension line bights extending through the loops to hold the panels and skirt together and a plurality of openings are provided with a further plurality of suspension line bights to further assure a controlled deployment.

* * * * *